A. A. HUSEBY.
MOTOR CONTROLLING MECHANISM FOR TALKING MACHINES.
APPLICATION FILED JULY 26, 1915.
1,224,301.
Patented May 1, 1917.
5 SHEETS—SHEET 1.
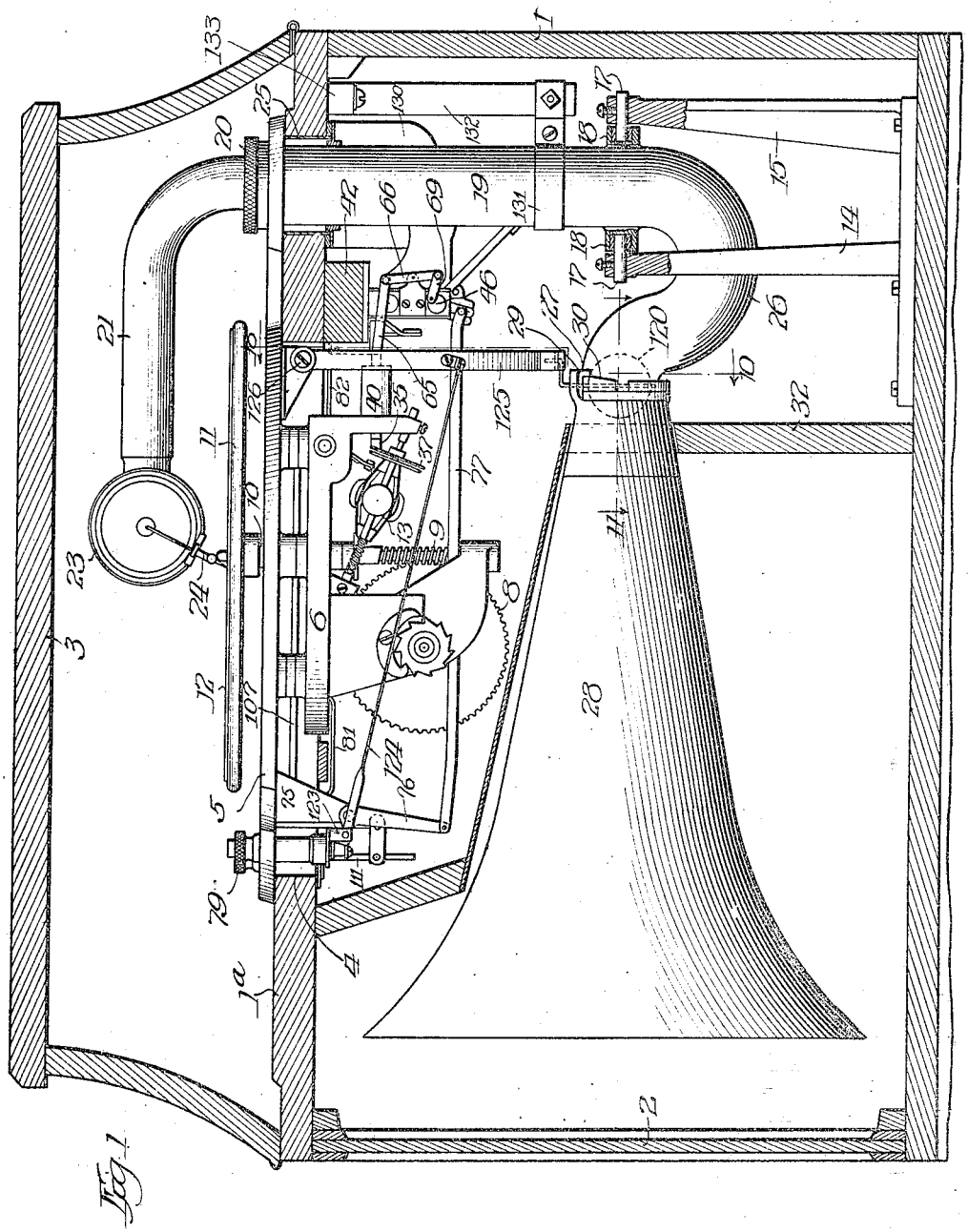

A. A. HUSEBY.
MOTOR CONTROLLING MECHANISM FOR TALKING MACHINES.
APPLICATION FILED JULY 26, 1915.
1,224,301.
Patented May 1, 1917.
5 SHEETS—SHEET 2.
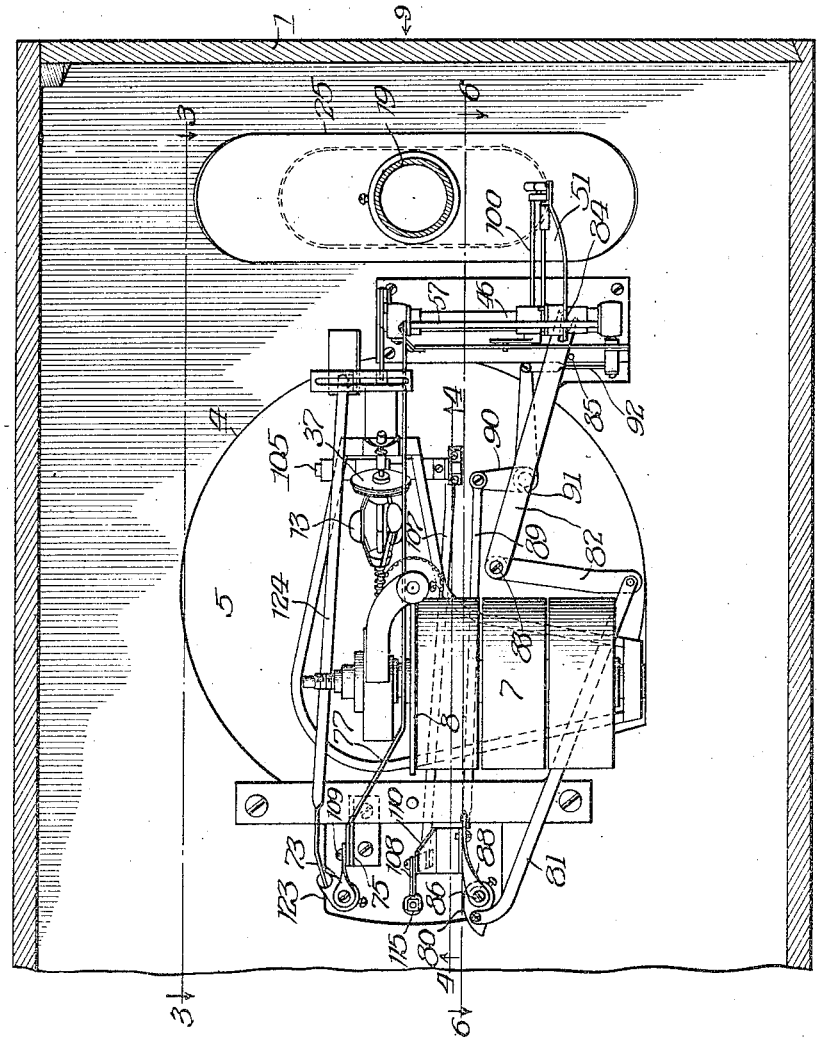
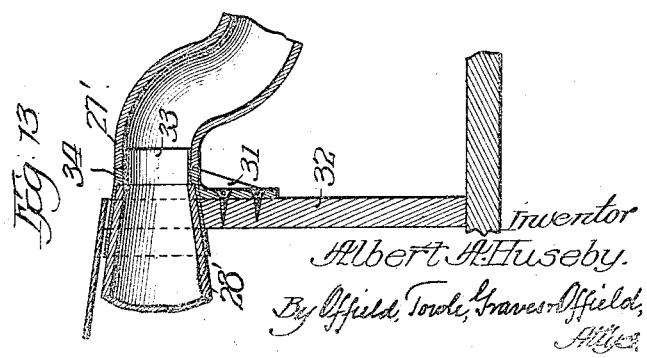

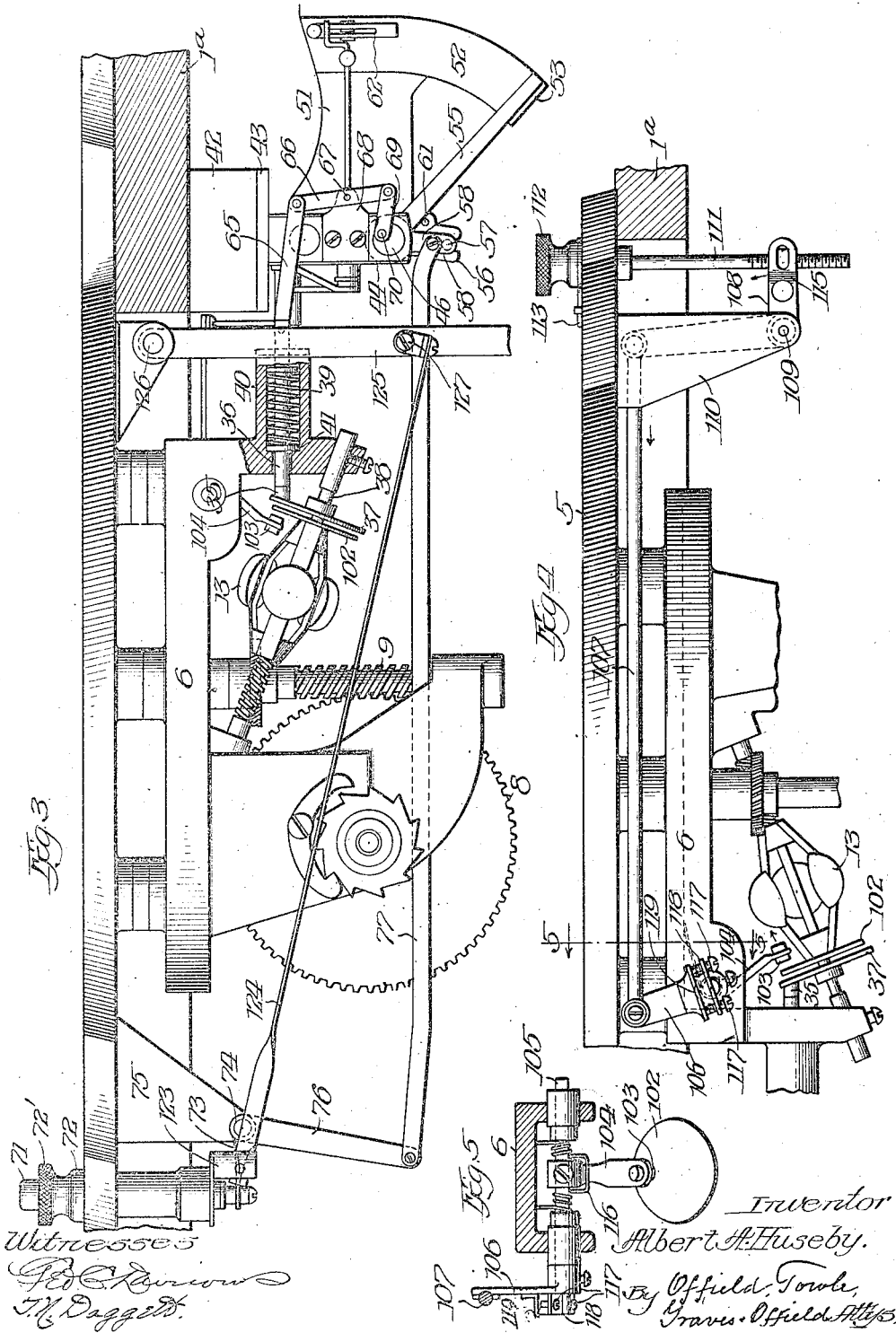

A. A. HUSEBY.
MOTOR CONTROLLING MECHANISM FOR TALKING MACHINES.
APPLICATION FILED JULY 26, 1915.
1,224,301.
Patented May 1, 1917.
5 SHEETS—SHEET 4.
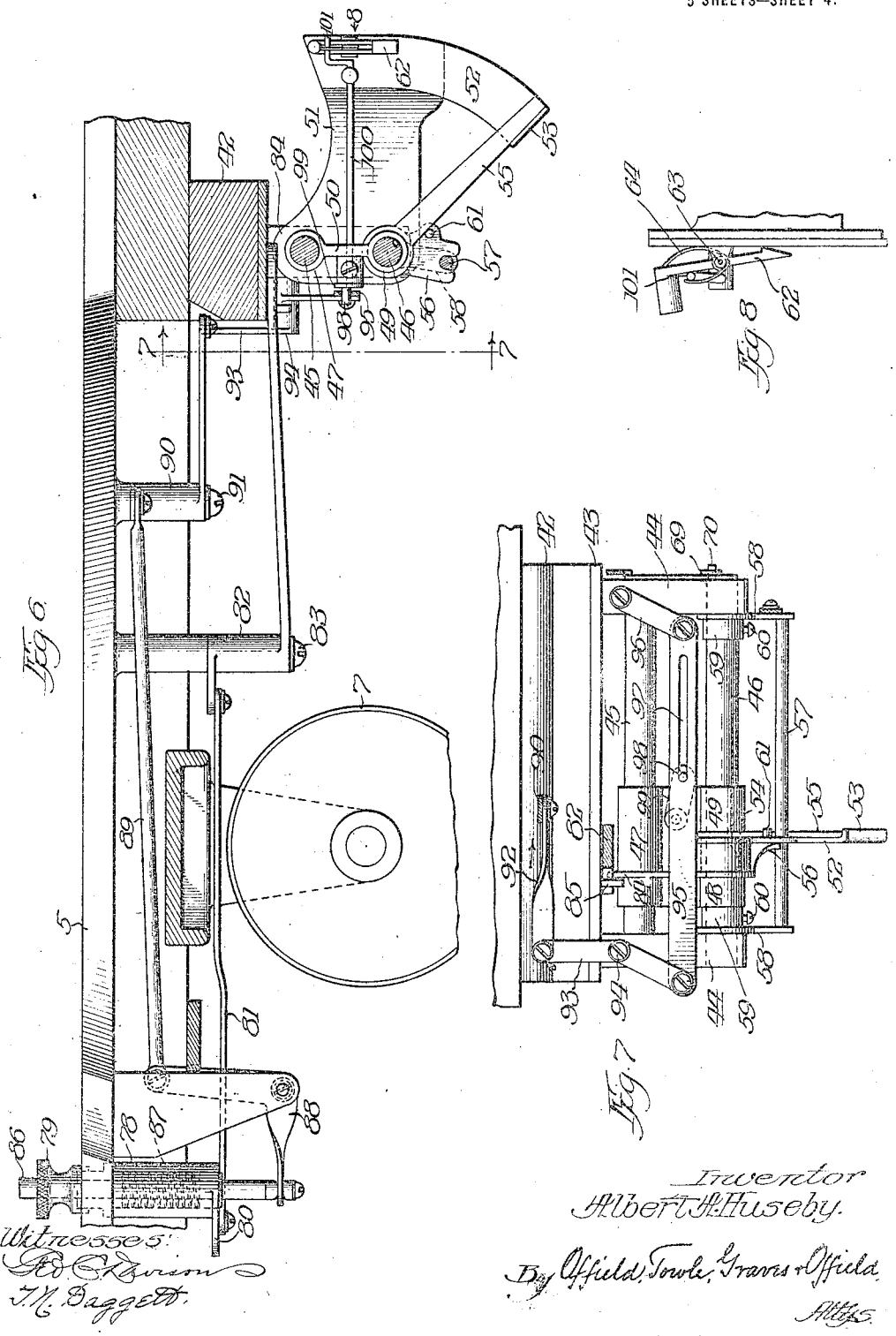

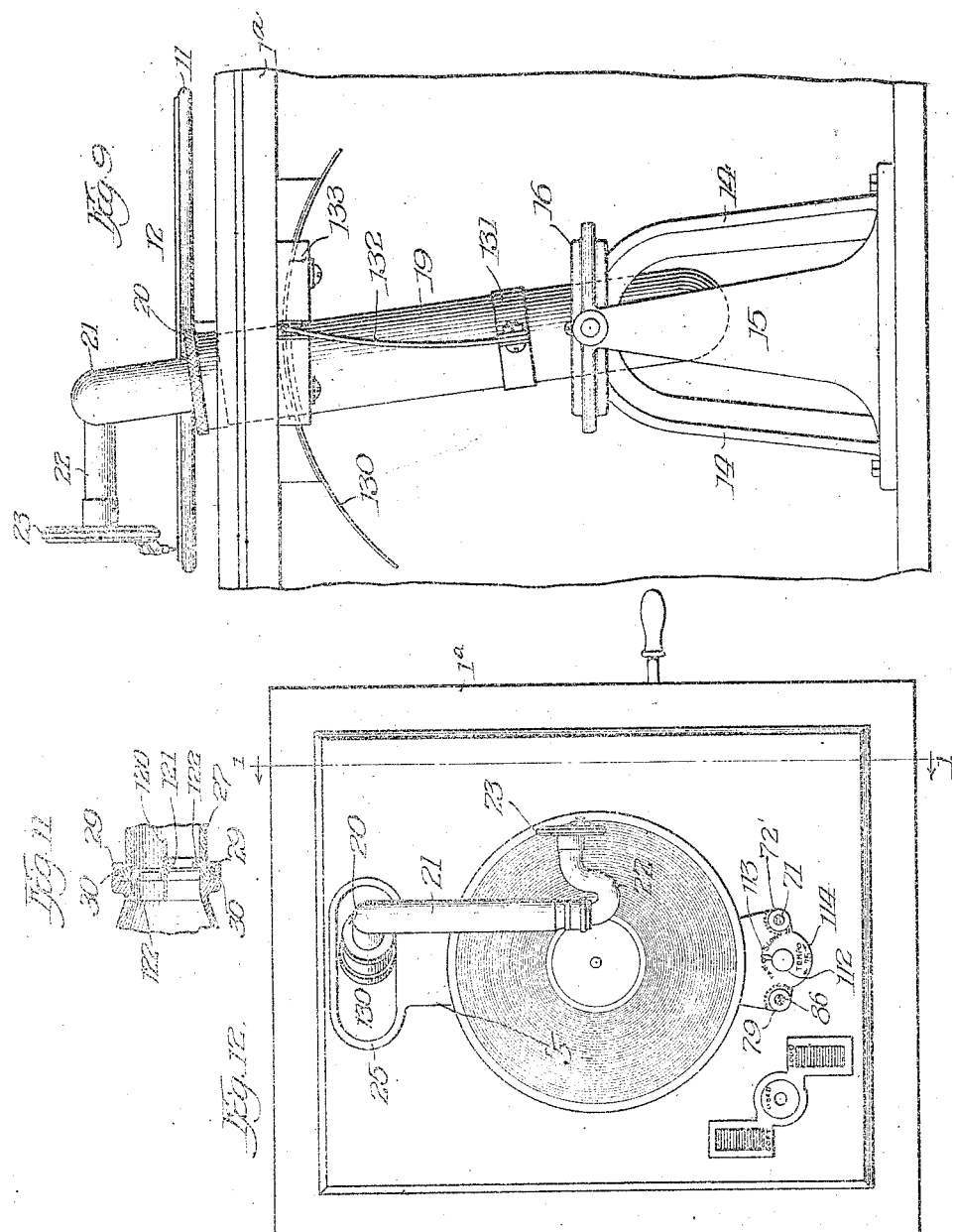

UNITED STATES PATENT OFFICE.

ALBERT A. HUSEBY, OF CHICAGO, ILLINOIS.

MOTOR-CONTROLLING MECHANISM FOR TALKING-MACHINES.

1,224,301.   Specification of Letters Patent.   Patented May 1, 1917.

Application filed July 26, 1915. Serial No. 41,821.

*To all whom it may concern:*

Be it known that I, ALBERT A. HUSEBY, a citizen of the United States, residing at Chicago, in the county of Cook and State of Illinois, have invented certain new and useful Improvements in Motor-Controlling Mechanisms for Talking-Machines, of which the following is a specification.

This invention relates to the art of phonographs or talking machines, and the general purpose or object thereof is to provide improvements in the motor controlling mechanism of the machine. More specific objects of the invention, as will clearly appear in the following detailed description, are, to provide an improved automatic stop for arresting the rotation of the turn-table when the needle has reached the end of the record; and to provide improved manual starting and stopping devices for the motor and turn-table. Other minor objects and advantages secured by the invention will be readily understood and appreciated from a consideration of the following detailed description of the practical and approved mechanical embodiment thereof shown in the accompanying drawings, in which—

Figure 1, is a side elevation, with the box or case and certain of the supporting parts appearing in vertical section. Fig. 2 is a bottom plan view, in section, through the sound tube, and with the horn omitted for the sake of clearness. Fig. 3 is an enlarged side elevation, partly in section, of a portion of the mechanism shown in Fig. 1, as seen (in sidewise inverted position) on the line 3—3 of Fig. 2. Fig. 4 is a side elevation, partly in section, on an enlarged scale, of the speed-adjusting mechanism, as seen (in endwise inverted position) on the line 4—4 of Fig. 2. Fig. 5 is a detail view in vertical section on the line 5—5 of Fig. 4. Fig. 6 is a view, partly in side elevation and partly in section, as seen (in sidewise inverted position) on the line 6—6 of Fig. 2. Fig. 7 is a detail view taken on the line 7—7 of Fig. 6. Fig. 8 is a fragmentary detail view of the latch mechanism, looking in the direction of the arrow 8 of Fig. 6. Fig. 9 is a fragmentary rear elevational view on an enlarged scale, mainly showing the sound tube and its supporting and balancing means. Fig. 10 is a detail view in vertical section of the damper operating mechanism taken on the line 10—10 of Fig. 1. Fig. 11 is a detail view in horizontal section of the damper and the means for attaching the horn to the sound tube, as seen on the line 11—11 of Fig. 1. Fig. 12 is a top plan view. Fig. 13 is a detail sectional view illustrating a swiveled connection of the horn and sound tube.

In the drawings 1 designates as an entirety the box or case in which the principal parts of the mechanism are housed, 2 designates the front door thereof, and 3 designates the hinged lid or cover. The top wall 1ᵃ of the case is formed with a large substantially central opening 4, over which is secured a plate 5, on the under side of which most of the mechanical parts are supported. In a suitable bracket structure 6 depending from the plate 5 is mounted a spring motor designated as an entirety by 7, this motor being of a well known construction and serving to drive, through a worm wheel 8 and worm 9, a vertical shaft 10 on the upper end of which is mounted the usual turn-table 11 that forms a support for the record disk 12. Also geared to and driven from the worm disk 8 of the motor is the usual centrifugal speed-governor designated as an entirety by 13, and referred to more particularly hereinafter.

In the rear portion of the box 1 are a pair of standards 14 and 15 (Figs. 1 and 9) rigidly connected at their upper ends by an annulus 16, and in the supporting frame structure thus formed are a pair of removable studs 17 that form supports from trunion bearings 18 that are secured to the upright section 19 of the sound tube. Into the upper end of the section 19 of the sound tube is removably secured by a milled nut 20 the upper section or arm 21 of the sound tube that overhangs the turn-table 11 and is provided on its free end with a swiveled curved extension 22 (Fig. 12) carrying the sound box 23, to which latter is connected in the usual manner the stylus or needle 24. The top wall 1ᵃ of the box is formed with a suitable opening 25 for the passage of the sound tube therethrough and accommodating the oscillating movements of the latter. The vertical section 19 of the sound tube has at its lower end a substantially semi-circular extension 26 terminating in a horizontally directed end portion 27, to which latter is secured the horn 28, said horn, as herein shown, being provided at its narrow end with a pair of hooks 29 (Fig. 11) that engage tapered flange sections 30 on the end of the sound tube. By reason of the described method of mounting the sound tube and horn, it will be observed that the arm 21 carrying the sound box swings through the arm of a circle whose center coincides with the axis of the pivot studs 17, the swiveled connection of the sections 21 and 22 of the arm maintaining the continuous engagement of the needle with the flat record disk. The axis of the horn 28 coincides with the axis of the pivot studs 17, so that the horn does not swing bodily, but, where rigidly connected to the sound tube, merely oscillates slightly about its own axis. In Fig. 13 I have illustrated a slight modification wherein the narrow end of the horn 28' is rigidly secured to a bracket 31 carried on an upright 32, and within the end 27' of the sound tube is secured a thin sleeve or ferrule 33 that telescopes within a boss 34 of the bracket 31 and registers with the inner or narrow end of the horn.

Referring next to the starting and stopping mechanisms, the motor is normally held idle when the instrument is not in use by a brake-shoe 35 (Fig. 3) mounted on the end of a slidable rod 36 and engaging a brake-disk 37 that is fast on the governor shaft 38. The brake-shoe is normally urged into engagement with the brake-disk by a spring 39 confined within a hollow boss 40 on the supporting frame member 6 abutting at one end against the outer end of said boss and at its other end against a collar 41 on the rod 36.

Referring now to Figs. 3, 6, 7 and 8,— secured to a block 42 carried by the top wall 1ᵃ of the box is a plate 43 having a pair of parallel depending arms 44 in and between which are mounted parallel shafts 45 and 46, the shaft 45 being fixedly mounted, and the shaft 46 being rotatable. Slidably engaging the shafts 45 and 46 is a slide-block comprising a sleeve 47 (Fig. 7) on the shaft 45, a pair of shorter sleeves 48 and 49 on the shaft 46, and a connecting web 50 (Fig. 6). Integral with and extending rearwardly of the slide-block is an arm 51 carrying on its outer end a downwardly and inwardly curved extension 52 terminating in a stop 53. Splined on the shaft 46 and confined endwise between the short sleeves 48 and 49 of the slide-block is the hub 54 of a latch-bar 55, the free end of which, in its lowered position, rests against the stop 53, as shown in Figs. 6 and 7. Sleeved on the hub 54 of the bar 55 is a short depending arm 56 having a forked lower end which straddles a rod 57 that is suspended by links 58 from the shaft 46. Collars 59 secured by set screws 60 on the shaft 46 confine the links 58 in fixed position on the shaft. The arm 56 carries a lateral pin 61 that engages the lower edge of the bar 55 and serves to swing the latter bar upwardly into engagement with a catch 62 (Fig. 8) that is pivoted at 63 on the free end of the arm 51 and is normally urged into holding engagement with the free end of bar 55 by a spring 64.

Referring to Fig. 3,—to the outer end of the rod 36, which carries the brake-shoe 35, is secured a link 65 connected to the upper end of a lever 66 that is pivoted at 67 to a bracket 68 on the arm 44, and the lower end of lever 66 is connected by a link 69 to an eccentric pin 70 on one end of the rotary shaft 46. It will thus be seen that the force of the spring 39 maintains the brake-shoe 35 in engagement with the brake-disk 37 and also, through the connections last described to shaft 46, tends to turn said shaft in a direction to swing the bar 55 to its lowermost position, shown in Figs. 3 and 6, where it is arrested by the stop 53. The brake-shoe 35 is withdrawn from the brake-disk 37 in starting the instrument by mechanism comprising the following parts. Referring to Fig. 3, 71 is a depressible pin slidably mounted in a sleeve 72 that is secured in a forward extension of the plate 5 and also passes through the central opening of the top plate 1ᵃ of the box, and the lower end of pin 71 is secured to the horizontal arm 73 of a bell crank lever pivoted at 74 to a bracket 75 on the plate 5, and the depending arm 76 of said bell crank lever is connected by a long link 77 to one of the arms 58 that carries the rod 57. It will thus be seen that when the pin 71 is depressed, the shaft 46 will be rocked by reason of the rod 57 swinging the arm 56 upwardly and the pin 61 swinging upwardly the latch-bar 55 which has a splined connection to shaft 46. This compresses spring 39 and withdraws the brake-shoe 35, and at the same time the free end of latch-bar 55 is caught and held by catch hook 62 so that the motor continues to work uninterruptedly until the catch is tripped, either manually or automatically, as hereinafter described, permitting the spring 39 to expand and apply the brake and at the same time return the brake-releasing parts above described to normal or idle position.

The latch mechanism for holding the latch-bar 55 is located across the path of movement of the vertical swinging section 19 of the sound tube, and in order that the latch-bar may be automatically released when the needle has reached the inner end of the record, I provide means for preliminarily moving the slide-block lengthwise of the shafts 45 and 46 to a position wherein the sound tube 19 will strike the latch when it has swung to the limit of its movement in playing any given record. This slide-block-setting mechanism, as best shown in Figs. 2 and 6, comprises a sleeve 78 mounted in the plate 5 and extending through the top wall 1ᵃ and having on its outer end a milled nut 79 by which it may be turned, and on its lower end an arm 80, a link 81, and a bell crank lever 82 pivoted to a depending stud 83 on the plate 5, the free end of the rearwardly extending arm of bell crank 82 being forked and embracing a transverse rib 84 on the slide-block, a stop-pin 85 (Fig. 7) serving to limit the extent of idle or back-swinging movement of the forked arm of the bell crank. To effect the automatic stopping of the motor at the completion of the record through the mechanism last described, when the record disk is placed on the turn-table the operator first swings the arm 21 inwardly, bringing the needle 24 into the last or inmost coil of the record groove. He then manipulates the nut 79, thereby shifting the slide-block along the shafts 45, 46 until the upper end of the catch 62 strikes the sound tube 19. He then starts the instrument in operation by depressing the starting pin 71 which, as already stated, engages the bar 55 with the catch 62. As soon as the record is played, the sound tube 19 strikes the previously set catch and releases the latch-bar 55, thereby permitting the spring 39 to act and stop the motor through the brake 35.

Means are provided for manually arresting the motor at any desired time through a manual release of the latch-bar 55 by swinging the catch 62 to open position; this means comprises the following parts. Referring to Figs. 2, 6, 7, 8 and 12,—86 designates a pin that is slidably mounted within the sleeve 78 and is normally urged upwardly by a spring 87 within said sleeve. The lower end of the pin 86 is connected to one arm of a bell crank lever 88, the other arm of which is connected by link 89 to a second bell crank lever 90 pivoted on a stud 91 depending from the plate 5; and the other arm of bell crank lever 90 is connected by a link 92 (Fig. 7) to one arm of a vertical bell crank 93 pivoted at 94 on one of the arms 44. The depending arm of bell crank 93 is connected to one end of a bar 95 the other end of which bar is suspended from the other arm 44 by a link 96 that is parallel with the lower arm of bell crank 93, so that as the latter is swung, the bar 95 has a parallel ruler movement. The bar 95 has a longitudinal slot 97 engaged by a pin 98 on the outer end of a crank arm 99 fast on a shaft 100 that is journaled in the slide-block and its arm 51. On the outer end of shaft 100 is a crank 101 that lies across the upper portion of catch 62. When, therefore, pin 86 is depressed, catch 62 is swung to release position, permitting latch-bar 55 to drop and the motor to be arrested by the brake. The pin and slot connection 98, 97 of the crank arm 99 with the bar 95 permits the slide-block to be manipulated as described without any interference with the manual stopping mechanism.

Referring next to the speed-regulating mechanism for securing desired tempo effects, this is best illustrated in Figs. 2, 4 and 5, wherein 102 designates a brake-disk that is connected to and movable bodily with the expanding arms of the ball governor, and 103 designates a brake-shoe carried by the lower end of an arm 104 that is keyed on a short shaft 105 journaled in a portion of the frame structure 6. Keyed on one end of shaft 105 is an arm 106 to which is connected a link 107, the other end of which is connected to the vertical arm of a bell crank lever 108 pivoted at 109 in a bracket 110 depending from the plate 5. Journaled in the plate 5, and extending through the top wall 1ᵃ, is a vertical rod 111 carrying on its upper end a thumb-nut 112 preferably provided with a pointer 113 coöperating with a dial-plate 114. The lower portion of rod 112 is threaded and engages a nut 115 that is swiveled in the horizontal arm of bell crank lever 108. By turning the thumb-nut 112, the brake-shoe 103 is adjusted to a position to give the maximum desired speed. Any slack or lost motion in the connections between the thumb-nut 112 and the brake-shoe arm 104 is taken up by a spring 116, as shown in Fig. 5. Fine adjustments to compensate for wear on the brake-shoe 103 are effected by a pair of screws 117 threaded through a plate 118 secured in one end of the shaft 105 and bearing against an abutment flange 119 on the side of the arm 106. By loosening the fastening device of the arm 106 on the shaft 105 and turning the screws 117 in reverse directions, the necessary alteration in the angular relation of the arms 106 and 104 can be readily effected, and the arm 106 then re-fastened to the shaft 105.

Describing now the tone-damper or muffler, and referring particularly to Figs. 1, 3, 10 and 11, 120 designates a damper disk that is mounted on a pivot 121 in the throat of the horn, the opposite semi-circular edge portions of the disk being adapted to close against a pair of semi-ring members 122 of felt or any other suitable material. The damper-actuating mechanism comprises the sleeve 72 which surrounds the starting pin 71, an arm 123 on the lower end of said sleeve, a long link 124, and a vertically pivoted lever 125 that is suspended from a pivot pin 126 in the top wall 1ᵃ, is connected at 127 to the link 124, and has a slotted horizontal extension 128 at its lower end (Fig. 10), through the slot of which extends a crank 129 on the spindle or pivot 121 of the damper. By turning the milled upper end 72' of the sleeve 72 more or less, the damper may be closed or opened to any desired extent to modify the volume and intensity of the sound waves transmitted through the sound tube and horn. A damper such as that described located in the throat of the horn is much simpler and more effective as a sound-modifying medium than the usual shutters that are located in a wall of the box or casing in front of the horn, as is the common practice.

To the vertical portion 19 of the sound tube is secured a curved plate 130 (Fig. 9) that underlies and partially closes the oblong slot 25 through which the sound tube oscillates. This feature may, of course, be employed or omitted as desired. On the vertical section 19 of the sound tube is secured a ring or collar 131 to which is attached a leaf spring 132, the upper end of which is confined between a pair of stationary blocks 133. This spring 132, coöperating with the curved lower portion 26 of the sound tube, below its pivot, counterbalances the gravity effect of that portion of the sound tube above the trunnion, thus holding the sound tube substantially balanced in all positions.

From the foregoing description of an instrument embodying the various improved features which comprise the present invention, it is believed that the manner in which the several stated objects of the invention are accomplished will be easily comprehended by those familiar with this art. The details of the several mechanisms illustrated and described, may, of course, be modified as circumstances may require or the judgment of the builder dictate, without involving any substantial changes or sacrificing any of the benefits and advantages secured. Hence, I reserve to myself any and all such detail changes and modifications as may fairly fall within the spirit and purview of the invention as defined in the appended claims.

I claim—

1. In a motor-controlling mechanism for talking machines, the combination of a motor, a brake for said motor, a spring normally tending to apply said brake, a latch mechanism for holding said brake retracted disposed across the path of a movable element of the machine and adapted to be automatically unlatched by said movable element, a depressible pin, and lever and link connections from said pin to said latch mechanism whereby the latter may be unlatched to permit the application of the brake at any desired time.

2. In a motor-controlling mechanism for talking machines, the combination of a motor, a brake for said motor, a spring normally tending to apply said brake, a latch mechanism for holding said brake retracted disposed across the path of a movable element of the machine and adapted to be automatically unlatched by said movable element, a depressible pin, lever and link connections from said pin to said latch mechanism whereby the latter may be unlatched to permit the application of the brake at any desired time, a second depressible pin, and lever and link connections from said second pin to said latch mechanism whereby the latter may be latched to effect the retraction of the brake.

3. In a motor controlling mechanism for talking machines, the combination of a motor, a brake for said motor, a spring normally tending to apply said brake, a pivoted catch hook, a pivoted latch bar connected to said brake, manually operable means for swinging said latch bar into engagement with said catch hook to hold said brake retracted, and manually operable means for swinging said catch hook to release said latch bar.

4. In a motor controlling mechanism for talking machines, the combination of a motor, a brake for said motor, a spring normally tending to apply said brake, a slideway, a slide block on said slideway carrying a pivoted catch hook located in the path of movement of a movable element of the machine, and a pivoted latch bar slidable laterally with said slide block and serving, when engaged with said catch hook to hold said brake retracted.

5. In a motor controlling mechanism for talking machines, the combination of a motor, a brake for said motor, a spring normally tending to apply said brake, a slideway, a slide block on said slideway carrying a pivoted catch hook located in the path of movement of a movable element of the machine, a pivoted latch bar slidable laterally with said slide block and serving when engaged with said catch hook to hold said brake retracted, manually operable means for engaging said latch bar with said catch hook, and manually operable means for shifting said slide block to set said catch hook at any predetermined position in said path of movement.

6. In a motor controlling mechanism for talking machines, the combination of a motor, a brake for said motor, a spring normally tending to apply said brake, a slideway, a slide block on said slideway carrying a pivoted catch hook located in the path of movement of a movable element of the machine, a pivoted latch bar slidable laterally with said slide block and serving when engaged with said catch hook to hold said brake retracted, manually operable means for shifting said slide block to set said catch hook at any predetermined position in said path of movement, manually operable means for engaging said latch bar with said catch hook, and manually operable means for disengaging said latch bar from said catch hook.

7. In a motor-controlling mechanism for talking machines, the combination of a motor, a brake for said motor, a spring normally tending to apply said brake, a slideway, a slide-block on said slideway, an arm carried by said slide-block extending at right angles to said slideway, a pivoted catch-hook on the free end of said arm located in the path of a movable element of the machine, a pivoted latch-bar connected to said brake and extending in the direction of said arm, said latch-bar at its free end adapted to engage said catch-hook and hold said brake retracted, and manually operable means for shifting said slide-block lengthwise of said slideway.

ALBERT A. HUSEBY.